US006993687B2

(12) United States Patent
Kamon et al.

(10) Patent No.: US 6,993,687 B2
(45) Date of Patent: Jan. 31, 2006

(54) INFORMATION PROCESSING DEVICE AND INFORMATION PROCESSING METHOD, MAINTENANCE INFORMATION MANAGEMENT SYSTEM AND RECORDING MEDIUM

(75) Inventors: Hidekazu Kamon, Tokyo (JP); Eiji Tadokoro, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 10/149,963

(22) PCT Filed: Oct. 5, 2001

(86) PCT No.: PCT/JP01/08821

§ 371 (c)(1),
(2), (4) Date: Sep. 26, 2002

(87) PCT Pub. No.: WO02/33555

PCT Pub. Date: Apr. 25, 2002

(65) Prior Publication Data

US 2004/0078668 A1  Apr. 22, 2004

(30) Foreign Application Priority Data

Oct. 18, 2000 (JP) ............................. 2000-317631

(51) Int. Cl.
*G06F 11/00* (2006.01)
(52) U.S. Cl. .................. 714/47; 714/42; 714/44; 369/53.26
(58) Field of Classification Search .................. 714/25, 714/44, 47, 42; 369/53.26; 709/224; 372/38.09, 372/29.01, 29.014, 29.015, 29.02, 38.07
See application file for complete search history.

(56) References Cited

U.S. PATENT DOCUMENTS

| 4,747,091 | A | * | 5/1988 | Doi ............................ 369/116 |
| 5,334,826 | A | * | 8/1994 | Sato et al. ............. 235/462.06 |
| 5,355,121 | A | * | 10/1994 | Naito et al. .................. 340/584 |
| 5,367,670 | A | | 11/1994 | Ward et al. |
| 5,867,809 | A | * | 2/1999 | Soga et al. .................. 702/130 |
| 6,130,901 | A | * | 10/2000 | Takamine et al. ............. 372/32 |
| 6,359,433 | B1 | * | 3/2002 | Gillis et al. .................. 324/210 |
| 6,609,212 | B1 | * | 8/2003 | Smith ............................ 714/4 |
| 6,643,695 | B1 | * | 11/2003 | Takagi et al. ............... 709/224 |
| 6,697,695 | B1 | * | 2/2004 | Kurihara et al. ............. 700/121 |
| 2002/0073362 | A1 | * | 6/2002 | Arnaout et al. ............... 714/42 |

FOREIGN PATENT DOCUMENTS

| JP | 4-9871 | 1/1992 |
| JP | 2000-132365 | 5/2000 |

* cited by examiner

*Primary Examiner*—Scott Baderman
*Assistant Examiner*—Paul Contino
(74) *Attorney, Agent, or Firm*—Oblon, Spivak, McClelland, Maier & Neustadt, P.C.

(57) ABSTRACT

According to the present invention, maintenance data about a plurality of distribution terminal devices which are different from each other in frequency with which they are in use and circumstances under which they are in use are transmitted to a host computer, whereby a lifetime of a semiconductor laser can be predicted and an occurrence of a trouble can be detected without receiving information from a user or shops in which the distribution terminal devices are installed.

10 Claims, 8 Drawing Sheets

INFORMATION PROCESSING DEVICE AND INFORMATION PROCESSING METHOD, MAINTENANCE INFORMATION MANAGEMENT SYSTEM AND RECORDING MEDIUM

TECHNICAL FIELD

The present invention relates to an information processing device and an information processing method, a maintenance information management system and a recording medium, and more particularly relates to an information processing device and an information processing method, a maintenance information management system and a recording medium in which a lifetime of a part can be predicted or an occurrence of a trouble can be detected without receiving information from a user or shop and so forth where a distribution terminal device is installed by transmitting maintenance data of a plurality of distribution terminal devices, they are different in frequency with which they are used and circumstances under which they are used, to a host computer of a system in a system such as a content distribution system comprising a plurality of information processing devices connected via a network.

BACKGROUND ART

Recently, a service in which distribution terminal devices for distributing content data such as a piece of music are installed at a kiosk of a station, a convenience store and so forth, content data distributed from a host computer through a network are recorded on a magnetooptical disk such as an MD (Mini Disk) and the content data are distributed to audience is commercially available.

Because a large number of such distribution terminal devices are installed at various places, costs for sending maintenance staff to perform a regular maintenance of distribution terminal device become enormous.

In the distribution terminal device, its optical block for use in recording content data on the MD incorporates therein a semiconductor laser. In particular, since a lifetime of a semiconductor laser becomes considerably different depending upon frequency with which each distribution terminal device has been used and circumstances under which each distribution terminal device was installed, it is very difficult to predict a lifetime of a semiconductor laser. For this reason, in most cases, the maintenance staff visits a user (e.g., distributor, etc.) or a shop in which a distribution terminal device is installed to repair the distribution terminal device after the maintenance staff had received information on an occurrence of a trouble from the user or the shop.

When the maintenance of a distribution terminal device is to be carried out before the reliability of recorded content data by the semiconductor laser deteriorates, at present, the semiconductor laser should be exchanged earlier than the actual lifetime allowing for safety or the maintenance staff should regularly visit the place in which the distribution terminal device is installed, should inspect respective portions of the optical block and should confirm whether or not the semiconductor laser can be operated normally, which causes the maintenance costs to increase unavoidably.

Depending upon the place in which the distribution terminal device is installed, an inputted power source voltage becomes unstable due to some kinds of circumstances at a power source. For example, even though it can be confirmed that the power source voltage is stable when the distribution terminal device is installed, if electrical machinery and apparatus which consume a large electric power are installed near the distribution terminal device after the distribution terminal device had been installed, there is then the risk that the power source voltage of the distribution terminal device will become unstable.

When a power consumption within the same building is fluctuated depending upon a time period, it can be considered that the power source voltage is lowered during only a specific time period. If an enormous amount of content data is distributed from the host computer to the distribution terminal device in such time period, there is then a large possibility that an error will occur.

DISCLOSURE OF INVENTION

The present invention is implemented in view of the aforesaid aspect, and makes sure that a lifetime of a semiconductor laser can be predicted or an occurrence of a trouble can be detected without receiving information from a user or a shop and the like where a distribution terminal device is installed by transmitting maintenance data on a plurality of distribution terminal devices, which are different in frequency with which they are used and in circumstances under which they are used, to a host computer.

An information processing device according to the present invention comprises an input means for receiving inputted first information indicative of the condition of other information processing devices through a network, a memory means for storing therein a reference value concerning the first information, an accumulation means for accumulating the first information inputted by the input means and a generation means for generating second information concerning the maintenance of other information processing devices based upon the first information inputted by the input means, the reference value being stored in the memory means and the first information accumulated in the accumulation means.

The information processing device according to the present invention can further comprise a transmission means for transmitting content data to other information processing devices through the network. Other information processing devices are distribution terminal devices for providing a service in which content data distributed through the network is recorded on a recording medium.

The first information can contain data on the power source voltage of the distribution terminal device, and the transmission means can transmit content data during a time period in which the power source voltage of the distribution terminal device is stable based upon data on the power source voltage of the distribution terminal device.

The information processing device according to the present invention can further comprise an output means for outputting second information to other information processing devices, and the second information generated by the generation means may be a control signal for use in improving the operation condition of other information processing devices.

The second information generated by the generation means may be information for expressing a lifetime prediction value of predetermined part of other information processing devices.

The predetermined part may be a laser diode.

The second information generated by the generation means may be information indicative of a transition of the conditions of other information processing devices.

The first information may contain temperatures inside other information processing devices.

The first information may contain data on the power source of other information processing devices.

The first information may contain values of currents flowing to the predetermined part of other information processing devices.

An information processing method according to the present invention comprises an input step of receiving an input of first information indicative of conditions of other information processing devices through a network, a memory step of storing a reference value concerning the first information, an accumulation step of accumulating the first information inputted by the input step and a generation step of generating second information concerning a maintenance of other information processing devices based upon the first information inputted by the processing of the input step, the reference value stored by the processing of the memory step and the first information accumulated by the processing of the accumulation step.

A program contained in a recording medium according to the present invention comprises an input step of receiving inputted first information indicative of a condition of other information processing devices, a memory step of storing a reference value concerning the first information, an accumulation step of accumulating the first information inputted by the processing of the input step and a generation step of generating second information concerning a maintenance of other information processing devices based upon the first information inputted by the processing of the input step, the reference value stored by the processing of the memory step and the first information accumulated by the processing of the accumulation step.

In a maintenance information management system according to the present invention, a first information processing device comprises a transmission means for transmitting first information indicative of its own condition to a second information processing device through a network and the second information processing device comprises an input means for receiving inputted first information indicative of the condition of the first information processing device, a memory means for storing therein a reference value concerning the first information, an accumulation means for accumulating therein the first information inputted by the input means and a generation means for generating second information concerning the maintenance of the first information processing device based upon the first information inputted by the input means, the reference value stored by the memory means and the first information accumulated by the accumulation means.

The first information processing device may be a distribution terminal device for providing a service in which content data distributed through a network is recorded on a recording medium. The second information processing device may be a host computer for distributing content data through the network to the distribution terminal device.

The recording medium may be a magnetooptical disk.

In the information processing device, the information processing method and the program contained in the recording medium according to the present invention, the first information indicative of the conditions of other information processing devices is inputted through the network, the reference value concerning the first information is stored, the inputted first information is accumulated and the second information concerning the maintenance of other information processing devices is generated based upon the first inputted information, the stored reference value and the accumulated first information.

In the maintenance information management system according to the present invention, the first information processing device transmits the first information indicative of its own condition through the network to the second information processing device, and the second information processing device inputs thereto the first information indicative of the condition of the first information processing device through the network, stores therein the reference value concerning the first information, accumulates therein the inputted first information and generates the second information concerning the maintenance of the first information processing device based upon the inputted first information, the stored reference value and the accumulated first information.

BEST MODE FOR CARRYING OUT THE INVENTION

An embodiment according to the present invention will be described below with reference to the drawings.

Figure 1:
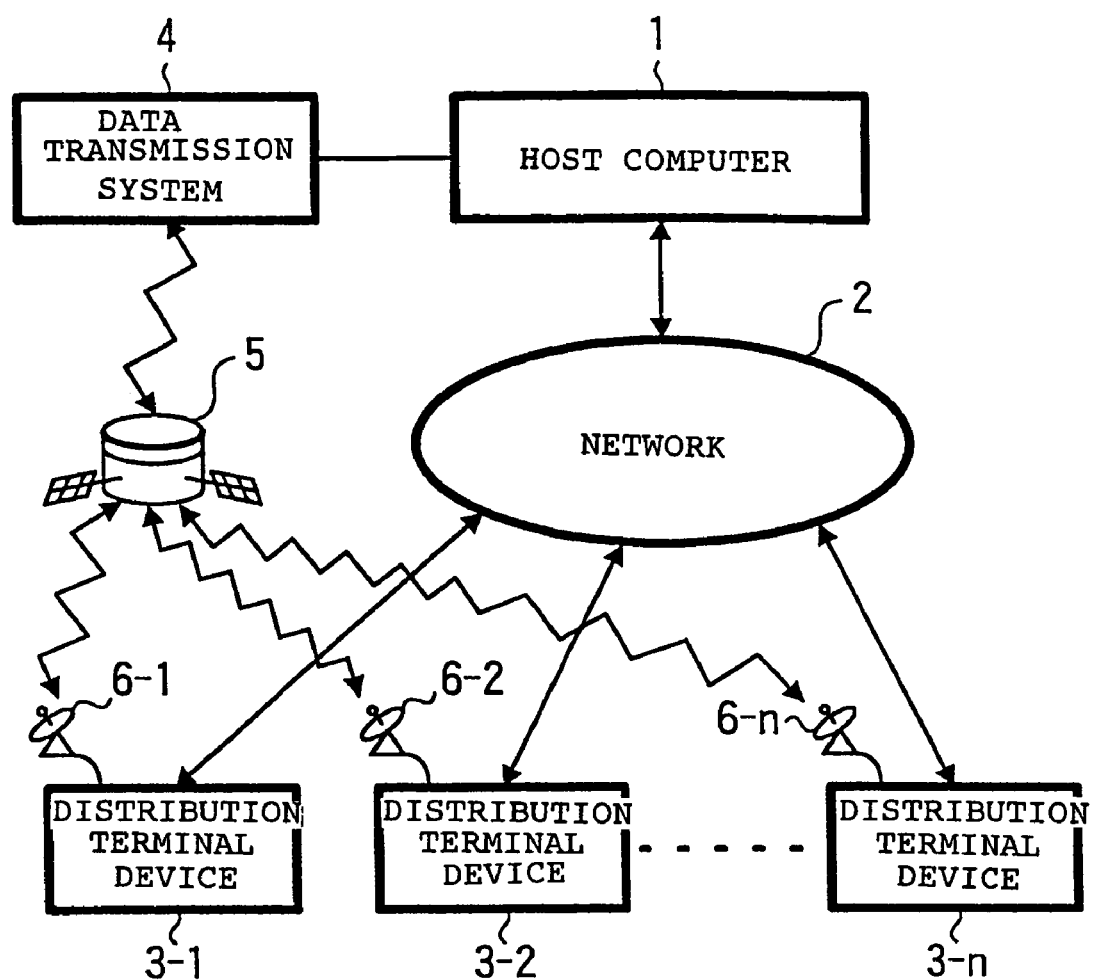
FIG. 1 is a diagram for explaining a content distribution system.

FIG. 1 is a block diagram showing an arrangement of a content distribution system to which the present invention is applied.

A host computer 1 is connected through a network 2 such as the Internet, a telephone line network or an exclusive line (e.g., POS (Point of sale) exclusive line) to distribution terminal devices 3-1 to 3-n installed at suitable places such as a convenience store or a kiosk to receive a variety of information such as requests for content distribution and to transmit content data through a data transmission system 4, a satellite 5 and antennas 6-1 to 6-n to the distribution terminal devices 3-1 to 3-n which request the distribution of content data.

When the host computer 1 transmits controls signals and so forth other than the content data to the distribution terminal devices 3-1 to 3-n, the host computer transmits these signals through the network 2 to the distribution terminal devices.

While we have described with reference to FIG. 1 that information or signals other than the content data transferred between the distribution terminal devices 3-1 to 3-n and the host computer 1 are transmitted and received through the network 2 because they are small in data capacity and that the content data transmitted from the host computer 1 to the distribution terminal devices 3-1 to 3-n are transmitted and received through the data transmission system 4, the satellite 5 and the antennas 6-1 to 6-n because they are large in data capacity, the present invention is not limited thereto and these data may be transferred through only the network 2 or without using the network 2 at all, these data may be transferred through the data transmission system 4, the satellite 5 and the antennas 6-1 to 6-n. Furthermore, these data may be transferred by selecting data transmission and reception paths according to the need.

When the distribution terminal devices 3-1 to 3-n need not be distinguished from each other, they will be generally referred to as a "distribution terminal device 3" for simplicity. Also, when the antennas 6-1 to 6-n need not be distinguished from each other, they will be generally referred to as an "antenna 6" for simplicity.

The host computer 1 receives inputted data for designating content such as music data that users desired to be distributed through the network 2 from the distribution terminal device 3 and transmits designated content data through the network 2 to the distribution terminal device 3. Moreover, the host computer receives inputted maintenance data from the distribution terminal device 3 through the network 2 and executes a predetermined processing which will be described later on, detects a trouble of the distribution terminal device 3 and calculates a lifetime prediction value of a predetermined part (e.g., laser diode, etc.) of the distribution terminal device 3.

The distribution terminal device 3 receives inputted content data from the host computer 1 and executes a processing, which will be described later on with reference to FIG. 7, to record content data on a magnetooptical disk such as an MD so that the content data may be distributed to a user. The distribution terminal device 3 transmits its own maintenance data through the network 2 to the host computer 1 together with its own device ID.

Figure 2:
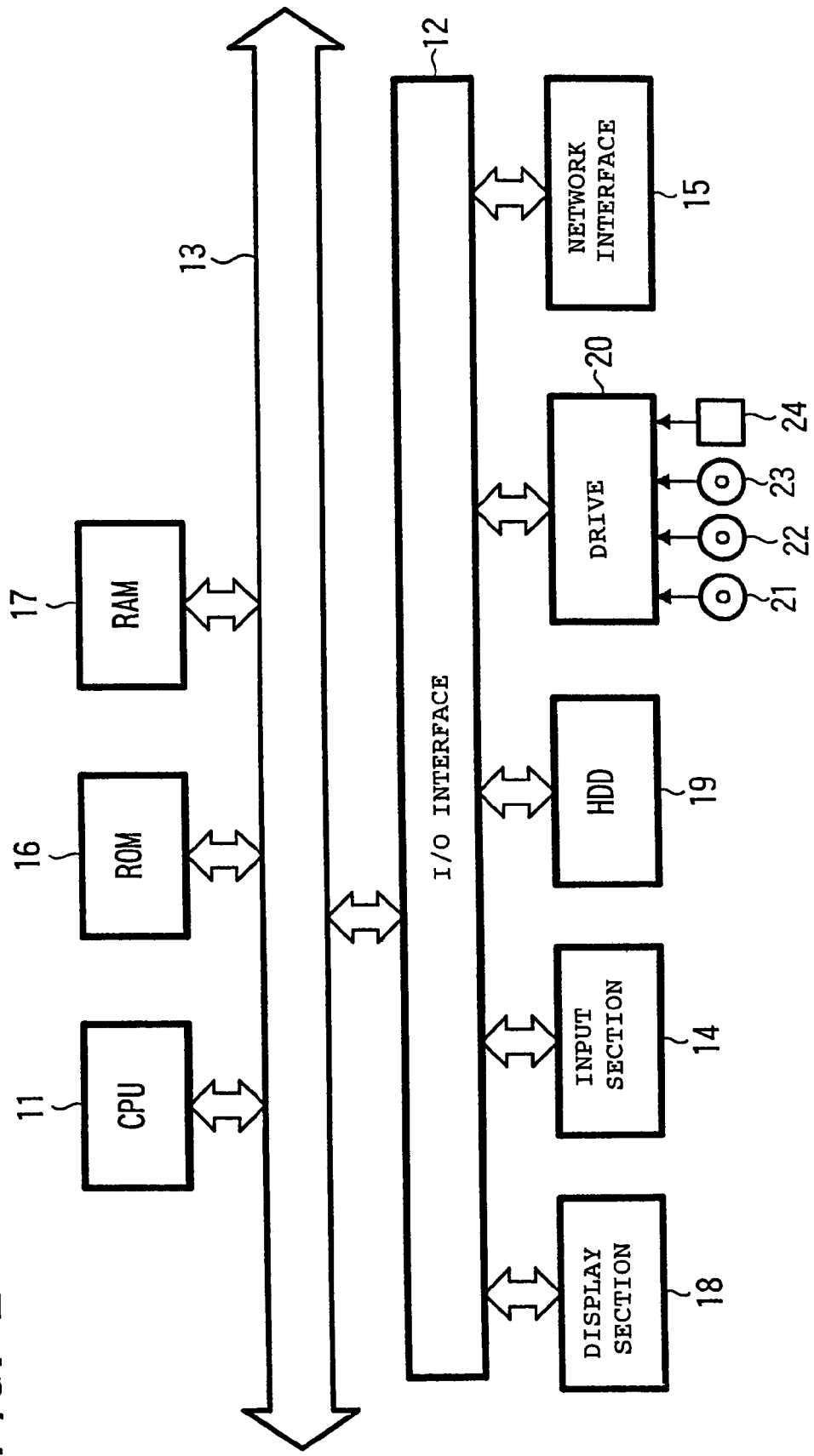
FIG. 2 is a block diagram showing an arrangement of a host computer shown in FIG. 1.

FIG. 2 is a block diagram showing the arrangement of the host computer 1.

A CPU (Central Processing Unit) 11 receives, through an I/O interface 12 and an internal bus 13, signals corresponding to various commands inputted from a content distribution system manager by using an input section 14 or signals inputted through a network interface 15 and executes various processings based upon these signals. A ROM (Read Only Memory) 16 stores therein programs for use with the CPU 11 and fundamental fixed data of calculation parameters. A RAM (Random Access Memory) 17 stores therein programs used when the CPU 11 executes a variety of processing and parameters which properly change as the processing is executed. The CPU 11, the ROM 16 and the RAM 17 are connected to each other through the internal bus 13.

The internal bus 13 is also connected to the I/O interface 12. The input section 14 is comprised of suitable devices such as a keyboard or a mouse and is operated when a user enters various commands to the CPU 11. A display section 18 is comprised of a CRT (Cathode Ray Tube) and so forth and displays thereon a variety of information in the form of a text or an image. An HDD (Hard Disk Drive) 19 drives a hard disk, detects content disks distributed to the distribution terminal device 3, a program for use with the CPU 11, data generated when these data are processed, device IDs of the distribution terminal devices 3-1 to 3-n, distribution terminal device information such as a date at which the distribution terminal device is installed and a place where the distribution terminal device is installed and a trouble of the distribution terminal device 3 and stores therein parameters for use in calculating a laser lifetime prediction value. Content data distributed to the distribution terminal device 3 may be stored in an external storage device, not shown.

Figure 3:
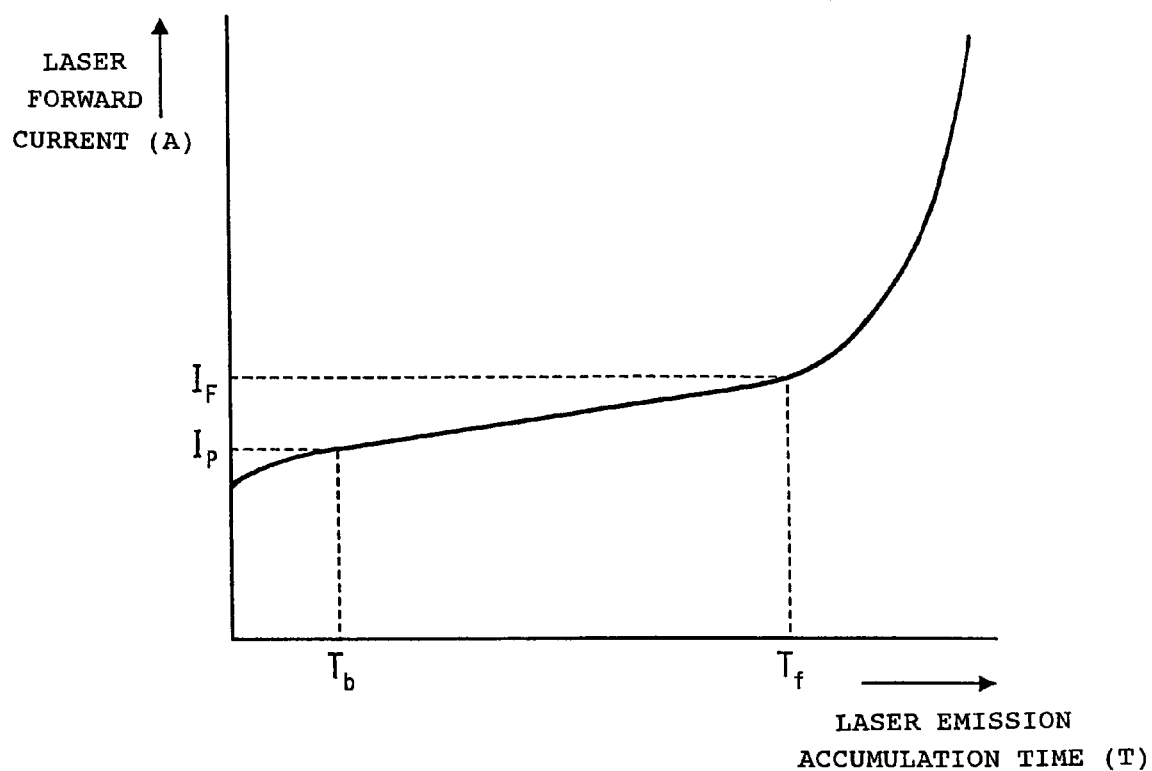
FIG. 3 is a graph for explaining a lifetime reaching multiple stored in an HDD shown in FIG. 2.

As the parameters for use in detecting a trouble of the distribution terminal device, there are enumerated a reference power source voltage value, a reference temperature indicative of a temperature obtained inside the device (e.g., reference temperature obtained near an optical pickup) and so forth, for example. As the parameters for use in calculating a laser lifetime prediction value, there are enumerated a lifetime reaching multiple of a laser forward current and so forth. Laser output current characteristics are deteriorated as an emission accumulation time is increased. As shown in FIG. 3, a laser forward current has characteristics in which an operation current used to emit a laser power of a certain constant intensity (e.g., a laser power of an intensity necessary for recording data) precipitously rises with the passage of certain time as a laser diode emits laser beams repeatedly. Therefore, by using sufficient numbers of laser diodes, it is measured how many times a laser forward current If in which an operation current precipitously rises (i.e., an operation of a laser diode becomes unstable) becomes as large as a reference laser forward current value Ip. A resultant measured value is assumed to be a lifetime reaching multiple of a laser forward current.

A drive 20 has a magnetic disk 21, an optical disk 22, a magnetooptical disk 23 and a semiconductor memory 24 loaded thereon according to the need and transfers data between it and them. The network interface 15 is connected to an external storage device, not shown, to transfer distribution content data between it and the external storage device. The network interface is connected through a telephone line network, not shown, to the network such as the Internet to transfer information between it and the distribution terminal device.

Figure 4:
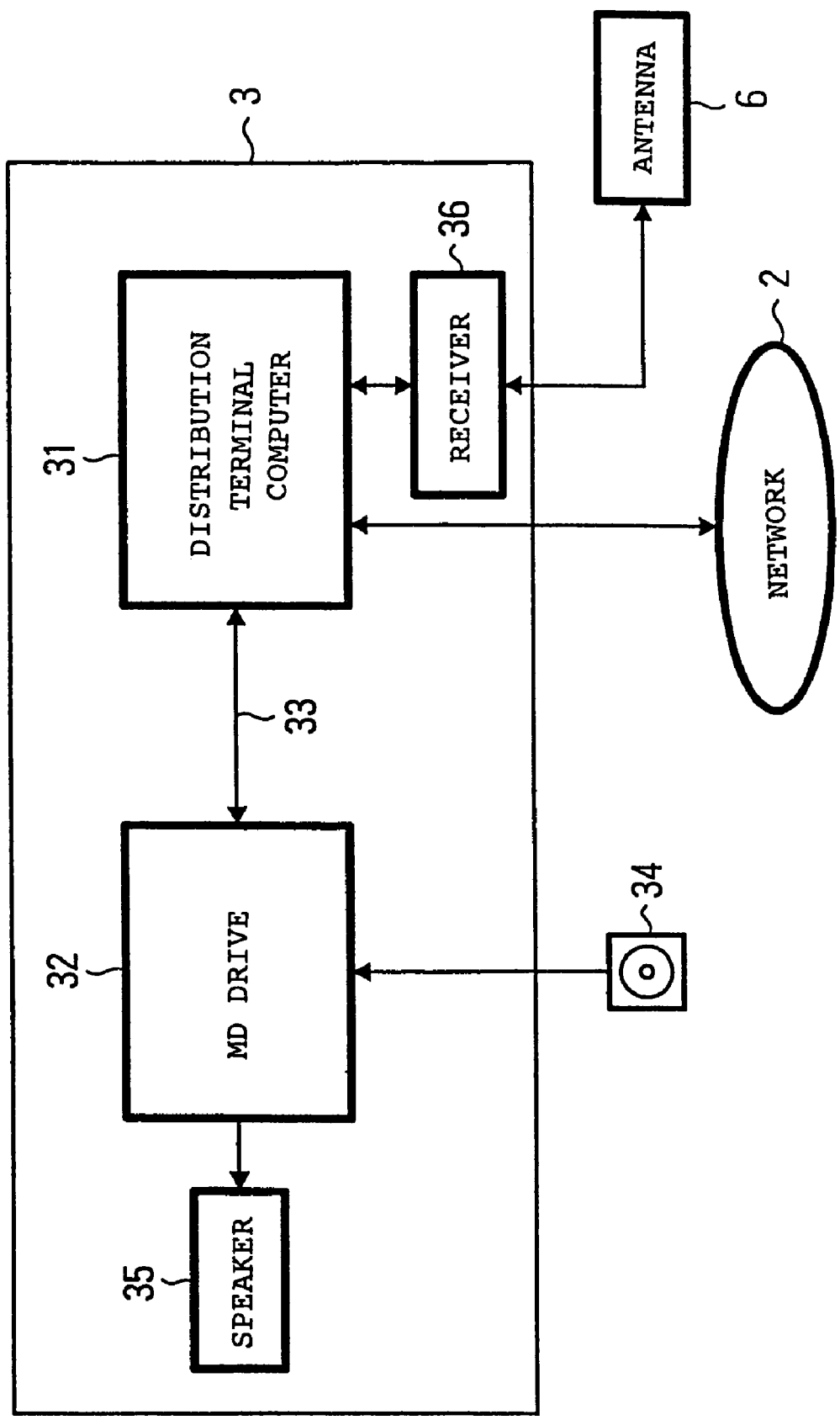
FIG. 4 is a block diagram showing an arrangement of a distribution terminal device shown in FIG. 1.

FIG. 4 is a block diagram showing the arrangement of the distribution terminal device 3. The distribution terminal device 3 is comprised of a distribution terminal computer 31, an IEEE1394 cable 33, an MD drive 32, a speaker 35 and a receiver 36. The distribution terminal computer 31 is connected to the network 2 and is also connected to the satellite 5 shown in FIG. 1 through the receiver 36 and the antenna 6 to transfer information between it and the host computer 1 shown in FIG. 1. The distribution terminal computer is also connected through the IEEE1394 cable 33 to the MD drive 32 to transfer information between it and the drive. The MD drive 32 is attached to the MD 34 such that content data supplied from the distribution terminal computer 31 can be recorded on the MD 34 or that content data recorded on the MD 34 can be reproduced and outputted to the speaker 35.

Figure 5:
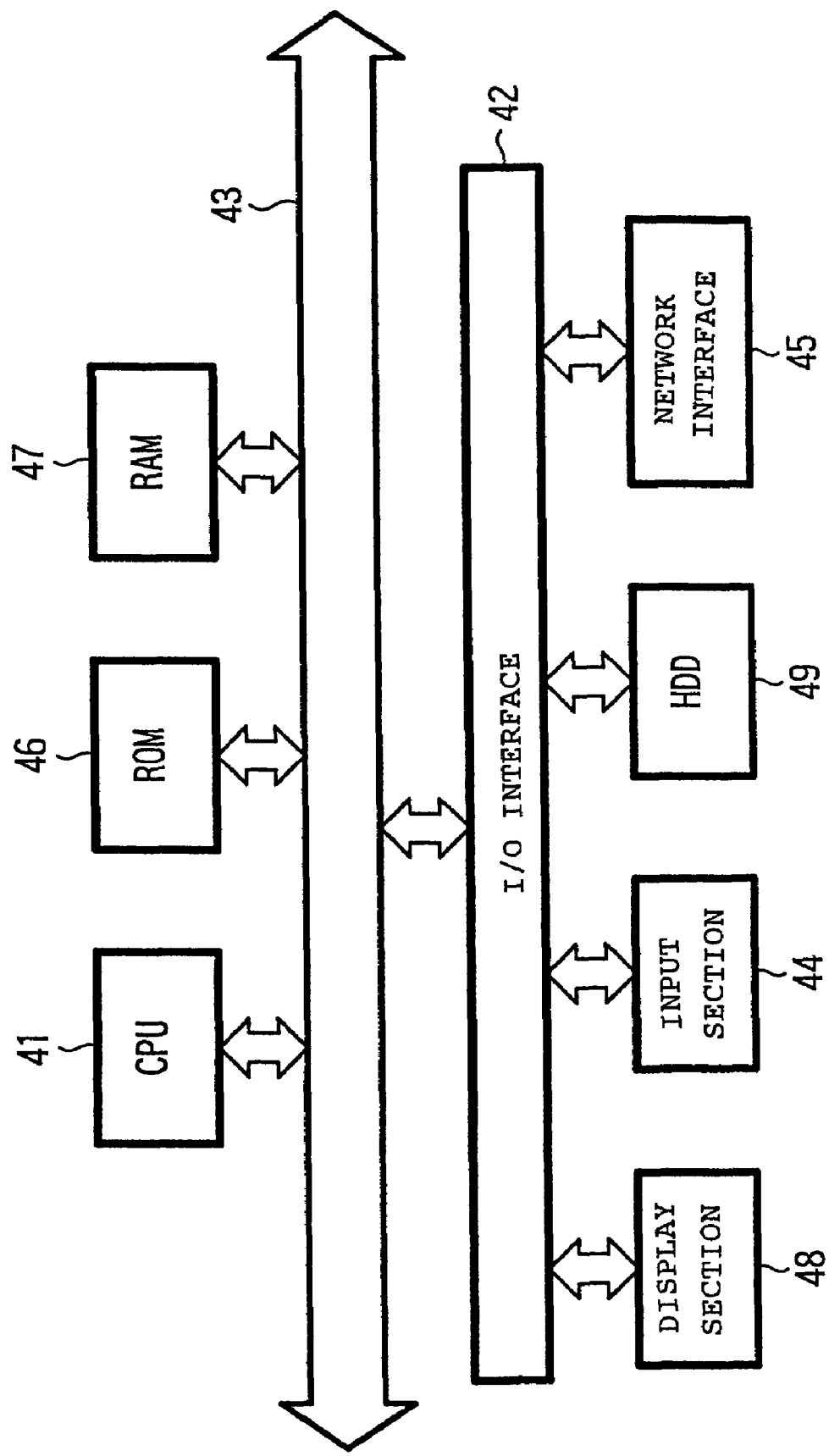
FIG. 5 is a block diagram showing an arrangement of a distribution terminal computer shown in FIG. 4.

FIG. 5 is a block diagram showing the arrangement of the distribution terminal computer 31. A CPU 41 receives, through an I/O interface 42 and an internal bus 43, a signal for designating content data to be recorded on the MD 34, as was inputted from a user using an input section 44 and a signal inputted through a network interface 45 and executes various processings based upon these signals. A ROM 46 stores therein programs for use with the CPU 41 and fundamental fixed data from among calculation parameters. A RAM 47 stores therein programs used when the CPU 41 executes various processings and parameters which properly change as various processings are executed. The CPU 41, the ROM 46 and the RAM 47 are connected to each other by the internal bus 43.

The internal bus 43 is also connected to the I/O interface 42. The input section 44 is comprised of a suitable device such as a keyboard or a touch panel and is manipulated by a user when receiving an input by the user. A display section 48 is comprised of a suitable display device such as an LCD (Liquid Crystal Display) and displays thereon a variety of information in the form of a text or an image. An HDD 49 drives a hard disk to record thereon its own device ID, content data distributed from the host computer 1 through the network 2, programs for use with the CPU 41 and data generated when these programs are processed. The network interface 45 is connected through a telephone line network, not shown, to the network 2 such as the Internet and is also connected to the satellite 5 through the receiver 36 and the antenna 6. Further, this network interface is also connected through the IEEE1394 cable 33 to the MD 32 to reciprocate information between it and either of the network 2, the satellite 5, and the MD 32.

Figure 6:
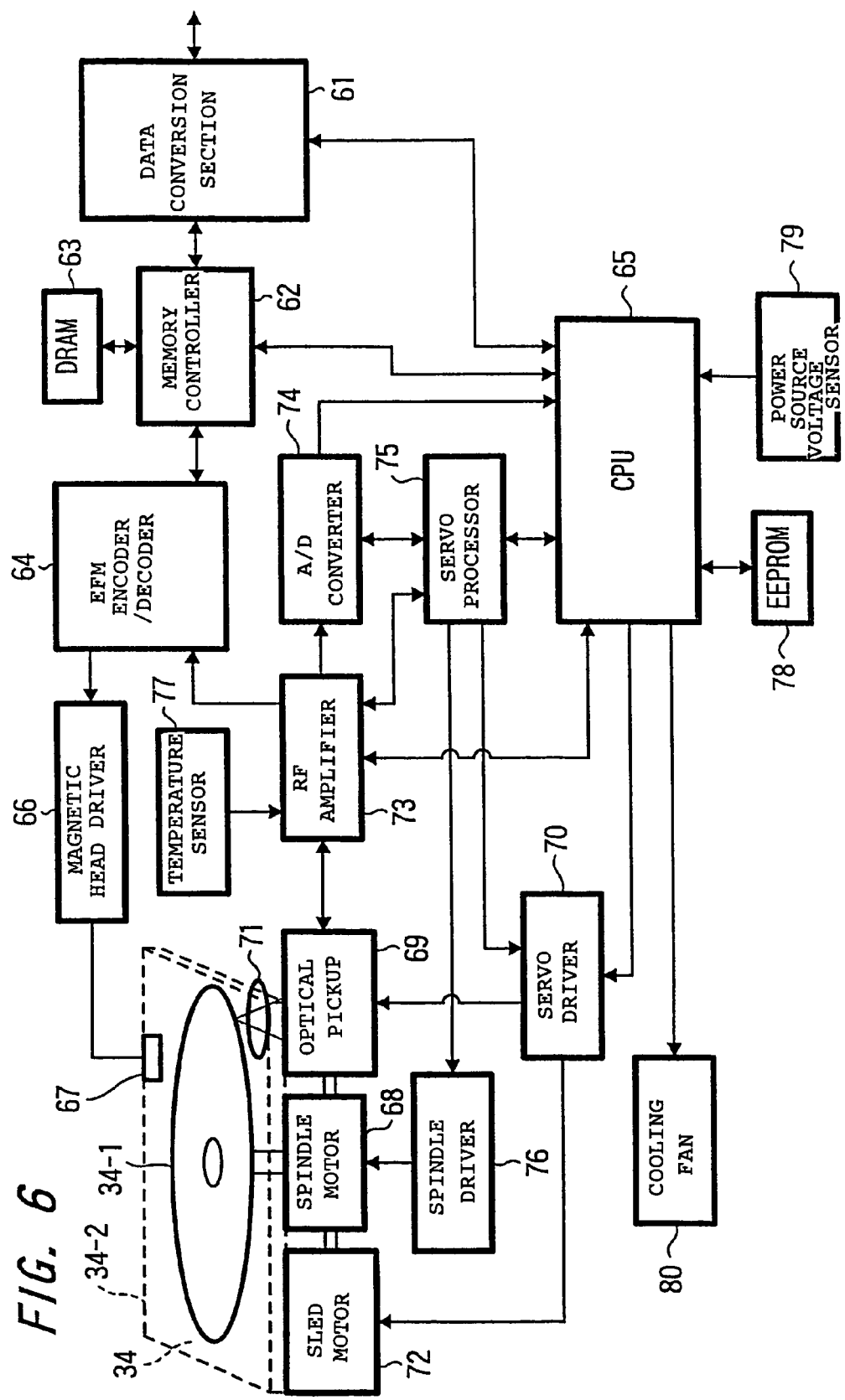
FIG. 6 is a block diagram showing an arrangement of an MD drive shown in FIG. 4.

FIG. 6 is a block diagram showing the arrangement of the MD 32.

Data, which has been ATRAC (Advanced Transform Acoustic Coding)-encoded, is inputted through the IEEE1394 cable 33 and supplied to a data conversion section 61, in which a header thereof is separated from such data and resultant data is converted into a format by which the resultant data can be recorded on the MD 34. Of the data thus converted, content data to be recorded on the MD 34 is outputted to and stored in a DRAM (Dynamic Random Access Memory) 63 under control of a memory controller 62. A variety of control information is outputted to a CPU 65.

The CPU 65 receives inputted various control information and controls respective sections of the MD drive 32 such that the respective sections may execute predetermined processings.

The memory controller 62 reads out data from the DRAM 63 at a predetermined timing and then outputs the read-out data to an EFM (Eight to Fourteen Modulation) encoder/decoder 64. The EFM encoder/decoder 64 EFM-modulates inputted data and outputs the data thus EFM-modulated to a magnetic head driver 66. The magnetic head driver 66 drives a magnetic head 67, which is provided in an opposing relation to an optical pickup 69, in accordance with a signal inputted from the EFM encoder/decoder 64. The magnetic head 67 applies a modulated magnetic field to a disk 34-2.

The MD 34 is comprised of a cartridge 34-1 and the disk 34-2 accommodated in this cartridge 34-1. The disk 34-2 is rotated by a spindle motor 68.

The optical pickup 69 incorporates therein a laser diode to emit laser light to the disk 34-2 under control of an APC (Auto Power Control) circuit, not shown, provided within an RF amplifier 73. When data is to be recorded on the disk 34-2, the laser diode emits laser light of an intensity high enough to heat the recording tracks of the disk 34-2 up to a Curie temperature. When data is read out (reproduced) from the disk 34-2, the laser diode emits laser light of a relatively low intensity to detect data from reflected light owing to an electromagnetic Kerr effect. The optical pickup 69 incorporates therein a detector for detecting reflected light and a laser current measuring section, not shown.

Laser light emitted from the laser diode is irradiated on the disk 34-2 through an objective lens 71. The objective lens 71 is comprised of a cylindrical lens, for example, and is held by a sled motor 72 and a biaxial actuator, not shown, in such a manner that it can be displaced in the radius direction of the disk 34-2 and the direction in which it is brought closer to or it is detached from the disk 34-2. The objective lens may focus laser light emitted from the optical pickup 69 on the recording surface of the disk 34-2. Beam spot positioning information obtained from the RF amplifier 73 is inputted through an A/D converter 74 to a servo processor 75. The servo processor 75 generates, based upon the inputted information a control, a signal which is used to precisely focus the beam spot on a predetermined position of the disk 34-2 and outputs this control signal to a servo driver 70. The servo driver 70 drives the sled motor 72 and the biaxial actuator, not shown. The address information about the data recorded on the disk 34-2 after it was obtained by the RF amplifier 73 is inputted through the A/D converter 74 to the servo processor 75. The servo processor 75 generates a control signal, which is used to rotate the spindle motor 68 at a predetermined revolution rate, based upon inputted information, and then outputs the control signal thus generated to the spindle driver 76. Based upon this control signal, the spindle driver 76 drives the spindle motor 68 to rotate the disk 34-2.

Data detected from the disk 34-2 by the detector provided within the optical pickup 69 is supplied to the RF amplifier 73. The RF amplifier 73 extracts a reproduced RF signal, a tracking error signal, a focus error signal, absolute position information recorded in a wobbling fashion, address information and the like from the data supplied thereto by subjecting the supplied data to calculation processing.

The reproduced RF signal is supplied to the EFM encoder/decoder 64, in which it is EFM-demodulated and supplied to the memory controller 62. The demodulated data is temporarily stored in the DRAM 63 under control of the memory controller 62, read out from the dynamic random-access memory to the memory controller 62 at predetermined timing and then outputted through the data conversion section 61 to the distribution terminal computer 31 or the speaker 35.

The tracking error signal, the focus error signal, the absolute position information recorded in a wobbling fashion and the address information are outputted through the A/D converter 74 to the servo processor 75. Based upon the information supplied from the A/D converter 74 and a track jump command, a seek command and so forth inputted from the CPU 65, the servo processor 75 generates control signals, which are outputted to the spindle driver 76 and the servo driver 70, to thereby execute the focus control and the tracking control.

The RF amplifier 73 amplifies not only various information detected by the detector incorporated within the optical pickup 69 but also an electric signal inputted from a temperature sensor 77. The temperature sensor 77 is disposed near the optical pickup 69. The A/D converter 74 converts the inputted analog signal to provide digital data and then outputs the digital data to the CPU 65.

Further, the RF amplifier 73 passes (i.e, does not process) an analog signal corresponding to a laser forward current from a laser current measuring section, not shown, provided within the optical pickup 69 and then outputs this analog signal to an analog input port of the CPU 65.

A power source voltage sensor 79 is connected to the analog input port of the CPU 65 and receives an inputted power source voltage value of the MD drive 32.

The CPU 65 outputs temperature data inputted from the A/D converter 74, laser forward current data inputted from the RF amplifier 73 and power source voltage data inputted from the power source voltage sensor 79 to an EEPROM (Electrically Erasable Programmable Read Only Memory) 78, in which they are recorded. When the MD drive 32 is shipped, the EEPROM 78 has previously stored therein the reference laser forward current value Ip which is used to emit laser light of an intensity necessary to record data while a reference temperature is set to 25° C., for example.

The CPU 65 reads out the reference laser forward current value Ip, the measured temperature data, the power source voltage data and the laser forward current data from the EEPROM 78 at every predetermined time or each time it receives a maintenance data transmission request transmitted from the host computer 1 through the network 2, the distribution terminal computer 31, the IEEE1394 cable 33 and the data conversion section 61 and outputs the data thus read out through the data conversion section 61 and the IEEE1394 cable 33 to the distribution terminal computer 31. The CPU 41 of the distribution terminal computer 31 transmits the inputted maintenance data and its own device ID through the network 2 to the host computer 1.

Further, while the CPU 65 controls an operation of a cooling fan 80 based upon the temperature data inputted from the A/D converter 74 in such a manner that a temperature within the device of the MD drive 32 may be kept less than a constant temperature, the present invention is not limited thereto and the central processing unit may control the operation of the cooling fan 80 in accordance with the control signal from the host computer 1.

A content data recording processing which is to be executed by the distribution terminal device 3 will be described with reference to a flowchart of FIG. 7.

At a step S1, the CPU 31 of the distribution terminal computer 31 receives a distribution desired content data designation, which has been entered from the input section 44 by the user, through the I/O interface 42 and the internal bus 43. It is determined at a step S2 by the central processing unit whether or not the designated content data is stored in the HDD 49.

If it is determined at the step S2 that the designated content data is stored in the HDD 49, then control goes to a step S5. If it is determined at the step S2 that the designated content data is not stored in the HDD 49, then control goes to a step S3, whereat the CPU 31 transmits a designated content data transmission request to the host computer 1 through the internal bus 43, the I/O interface 42, the network interface 45 and the network 2. At a step S4, the central processing unit receives the designated content data from the host computer 1 through the data transmission system 4, the satellite 5, the antenna 6, the receiver 36, the network interface 45, the I/O interface 42 and the internal bus 43. The CPU 41 outputs the received content data to the HDD 49, in which it is stored.

If it is determined at the step S2 that the designated content data is stored in the HDD 49 or at the completion of the step S4, then control goes to a step S5, whereat the CPU 31 of the distribution terminal computer 31 reads out the designated content data from the HDD 49 and outputs the designated content data thus read out to the MD drive 32.

The CPU 65 of the MD drive 32 records the designated content data on the MD 34. Specifically, the content data inputted to the data conversion section 61 is temporarily stored in the DRAM 63 under control of the memory controller 62 and then read out from the DRAM 63 and outputted to the EFM encoder/decoder 64. The EFM encoder/decoder 64 EFM-modulates the inputted data and outputs the data thus modulated to the magnetic head driver 66. The magnetic head driver 66 drives the magnetic head 67 in accordance with the signal inputted from the EFM encoder/decoder 64. The magnetic head 67 applies the modulated magnetic field to the disk 34-2 to record the designated content data and, then control is ended.

Figure 7:
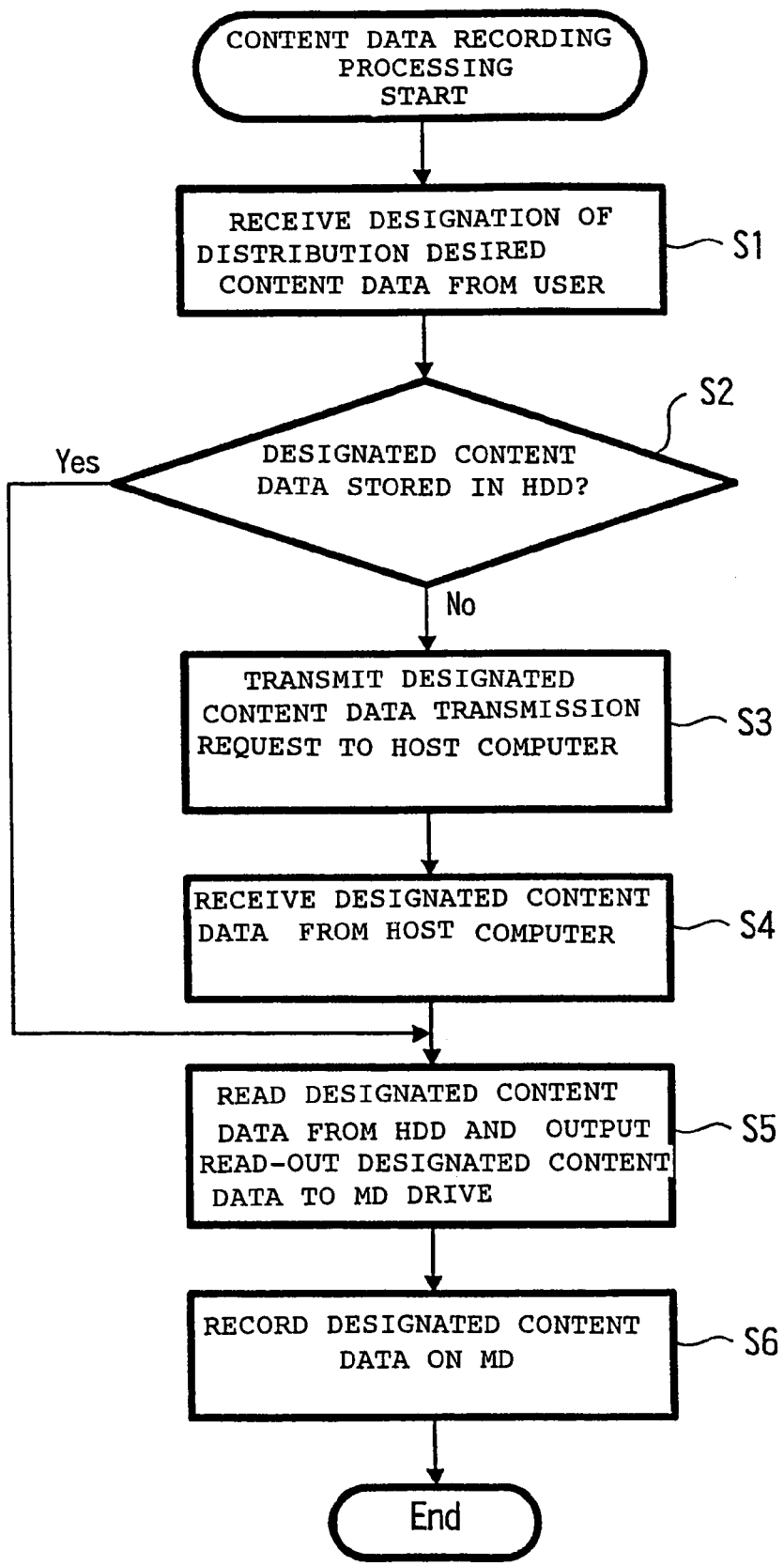
FIG. 7 is a flowchart for explaining the manner in which content data is recorded.

Although the content data is recorded on the MD 34 by the processing that has been described so far with reference to FIG. 7, if these controls are repeated a plurality of times, there is then the risk that as the lifetime of the laser in the optical pickup 69 will be ended, various electric circuit parts will be overheated or a temperature within the device will rise in accordance with a rise of a temperature near the optical pickup 69 and that the power source voltage will be fluctuated.

The CPU 65 has recorded the maintenance data on the EEPROM 78 as described above. At every predetermined time or each time the CPU 65 receives the maintenance data transmission request inputted from the host computer 1, this central processing unit reads out the maintenance data such as the temperature data, the laser forward current data (the present laser forward current value and the reference laser forward current value) and the power source voltage data from the EEPROM 78 and transmits the maintenance data through the data conversion section 61 and the IEEE1394 cable 33 to the distribution terminal computer 31. The distribution terminal computer 31 transmits the maintenance data and the device ID to the host computer 1 through the network 2.

Figure 8:
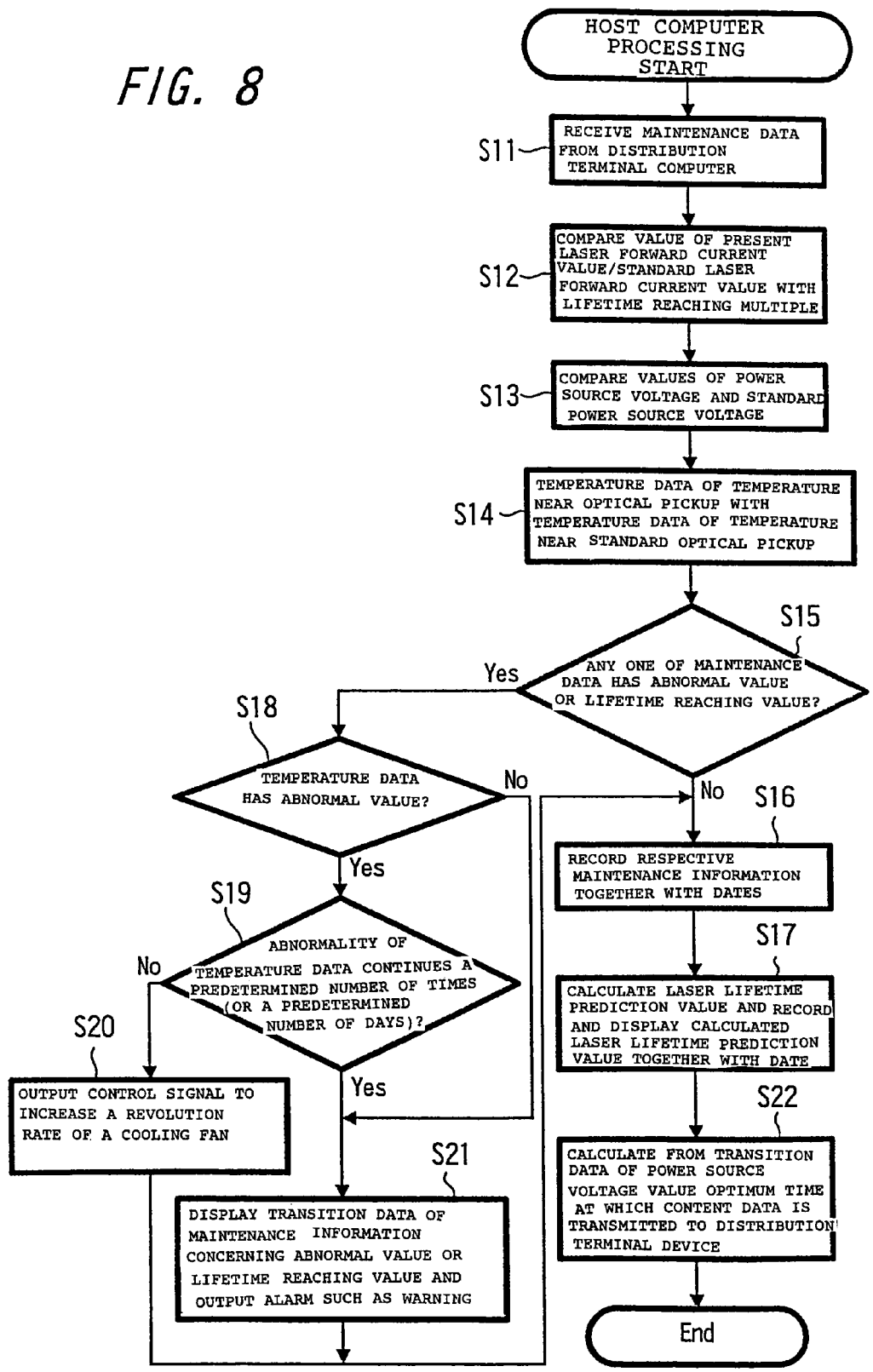
FIG. 8 is a flowchart for explaining the manner in which a host computer executes a processing.

The processing, which is to be executed by the host computer 1, will be described with reference to a flowchart of FIG. 8.

At a step S11, the CPU 11 of the host computer 1 receives the maintenance data such as the temperature data, the laser forward current data and the power source voltage data from the distribution terminal device 3 through the network 2, the network interface 15, the I/O interface 12 and the internal bus 13 together with the device ID of the distribution terminal device 3.

At a step S12, the CPU 11 compares the values of the present laser forward current value/standard laser forward current value with the lifetime reaching multiple stored in the HDD 19. At a step S13, this central processing unit compares the inputted power source voltage data with the standard power source voltage value stored in the HDD 19. At a step S14, this central processing unit compares the inputted temperature data indicative of the temperature near the optical pickup 69 with standard temperature data indicative of the temperature near the optical pickup 69 and which is stored in the HDD 19.

It is determined at a step S15 by the CPU 11 based upon the compared results of the steps S12 to S15 if any one of the maintenance data has an abnormal value or a lifetime reaching value. If it is determined at the step S15 that any one of the maintenance data has the abnormal value or the lifetime reaching value, then control goes to a step S18.

If it is determined at the step S15 that any one of the maintenance data does not have the abnormal value and the lifetime reaching value, then after a step S20, which will be described later on, has been ended or after a step S21, which will be described later on, has been ended, the CPU 11 outputs and records respective maintenance information on the HDD 19 through the internal bus 13 and the I/O interface 12 together with dates.

At a step S17, the CPU 11 calculates the laser lifetime prediction value and outputs the same through the internal bus 13 and the I/O interface 12 to the HDD 19, in which it is recorded together with a date and thereby outputted to and displayed on the display section 18. As a method of calculating a laser lifetime prediction value, a date at which the corresponding distribution terminal device is installed may be read out from the HDD 19, a time period in which the corresponding distribution terminal device has been installed so far may be calculated and a laser lifetime prediction value may be predicted by calculating a percentage at which the present laser forward current value/standard laser forward current value reaches the lifetime reaching multiple. Alternatively, a transition prediction curve of a laser forward current value may be calculated from history data about laser forward current values stored in the HDD 19 and the lifetime reaching multiple may be predicted.

Since the lifetime is predicted each time the central processing unit receives the maintenance data from the distribution terminal device 3, even when the circumstances under which the distribution terminal device 3 is in use and the frequency at which the distribution terminal device is in use are changed, it becomes possible to predict a lifetime of a laser diode at high accuracy.

If it is determined at the step S15 that any one of the maintenance data has the abnormal value or the lifetime reaching value, then control goes to the step S18, whereat it is determined by the CPU 11 whether or not the temperature data has an abnormal value. If it is determined at the step S18 that the temperature data doe not have the abnormal value, then control goes to a step S21.

If it is determined at the step S18 that the temperature data has the abnormal value, then control goes to a step S19, whereat it is determined by the CPU 11 based upon the history of the maintenance information recorded on the HDD 19 whether or not the abnormality of the temperature data continues a predetermined number of times (or a predetermined number of days). If it is determined at the step S19 that the abnormality of the temperature data continues a predetermined number of times (or a predetermined number of days), then it cannot be considered that the temperature has temporarily risen due to an external factor. Therefore, control goes to the step S21.

If it is determined at the step S19 that the abnormality of the temperature data does not continue a predetermined number of times (a predetermined number of days), there is then the possibility that the temperature has temporarily risen due to the external factor. Therefore, control goes to the step S20, whereat the CPU 11 generates a control signal for use in increasing the revolution rate of the cooling fan 80 of the MD drive 32, outputs this generated control signal through the network 2 to the corresponding distribution terminal device 3. Then, control goes to the step S16.

If it is determined at the step S18 that the temperature data is not the abnormal value (i.e., if other maintenance data than the temperature data exhibit the abnormal value or if the lifetime of the laser diode reaches the end) or if it is determined at the step S19 that the abnormality of the temperature data continues a predetermined number of times (or a predetermined number of days), then control goes to the step S21, whereat the CPU 11 outputs transition data of maintenance information concerning the abnormal value or the lifetime reaching value through the internal bus 13 or the I/O interface 12 to the display section 18, on which it is displayed. At the same time, the central processing unit also generates and outputs an alarm such as a warning (e.g., text data or image data displayed on the display section 18 or audio data outputted from a speaker, not shown). Then, control goes to the step S16.

At the completion of the step S17, control goes to a step S22, whereat the CPU 21 calculates from the transition data on the power source voltage values recorded on the HDD 19 an optimum time at which content data is transmitted to the distribution terminal device 3. Then, control is ended.

The distribution terminal devices 3 have different power source circumstances depending upon the places in which they are installed. Specifically, there can be considered the large probability that the power source voltage of the distribution terminal device will be lowered during a predetermined time period depending upon a power distribution situation of a building or situations under which electrical machinery and apparatus around the distribution terminal device are in use. In an office building, for example, it is frequently observed that power source voltages become unstable during a daytime in which an office automation system such as a photocopier and air-conditioning facilities are used very often. When equipment such as an electric water heater which consumes an electric power in the night is installed around the distribution terminal device 3, it can be considered that the power source voltage becomes unstable in the night. Accordingly, a time period having a large possibility that the power source voltage is most stable is selected from the history of the power source voltage transmitted from the distribution terminal device 3 as the maintenance data and the content data is transmitted to the distribution terminal device during that time period, whereby content data can stably be supplied to the distribution terminal device.

According to the above-mentioned processings, in the content data distribution system, since the maintenance data of the distribution terminal device 3 installed at a remote place is transmitted to the host computer 1 and the host computer 1 analyzes the maintenance data, the lifetime of the laser diode can be predicted, and the occurrence of the trouble can be detected without receiving information from a user or from a shop and the like in which the distribution terminal device 3 is installed. Therefore, the distribution terminal device 3 can be made highly reliable, and the maintenance cost of the whole of the system can be decreased considerably.

While the host computer 1 has collected the laser forward current value, the temperature data indicative of the temperature near the optical pickup 69 and the power source voltage data as the maintenance data as described above, it is needless to say that the present invention is not limited thereto and that the host computer may collect other maintenance data (e.g., the laser emission accumulation time, the current value of the current flowing to other parts or the temperature data indicative of the temperature measured at other positions of the MD drive 32, etc.) and may execute an analyzing processing concerning the maintenance based upon these data.

Furthermore, since the maintenance information and the lifetime prediction data are respectively recorded together with dates in the processing at the steps S16 and S17, if a trouble occurs in the distribution of the content in the future, these information can effectively be used to analyze the cause of the trouble.

While the content distribution system in which the content data is distributed by the distribution terminal device 3 including the MD drive 32 has been described so far, the present invention is not limited thereto, and can be applied to various data transfer systems comprising a host computer and terminal devices connected via a network or a satellite.

A series of the above-mentioned processing may also be executed by software. Such software is installed in a computer in which programs comprising such software are built in exclusive-hardware or a general-purpose personal computer and so forth, for example, which can execute various functions by installing various programs from a recording medium.

As shown in FIG. 2, this recording medium is comprised of package media consisting of the magnetic disk 21 (including the floppy-disk), the optical disk 22 (including a CD-ROM (Copact Disc-Read Only Memory) and a DVD (Digital Versatile Disk)), the magnetooptical disk 23 (including an MD (Mini-Disk)) or the semiconductor memory 24 and so forth in which programs distributed for providing programs to users are recorded independently of a computer.

In the specification of the present application, the steps for describing the programs recorded on the recording medium may contain not only the processing which is executed in accordance with the described order in a time-series fashion but also processing which is not always executed in a time-series fashion and which may be parallelly or individually executed.

In the specification of the present application, the "system" represents the whole of the device which is comprised of a plurality of devices.

According to the information processing device, the information processing method and the program contained in the recording medium of the present invention, since the inputted first information indicative of the condition of other information processing devices is received through the network, the reference value concerning the first information is stored, the inputted first information is accumulated and the second information concerning the maintenance of other information processing devices is generated based upon the inputted first information, the stored reference value and the accumulated first information, it is possible to predict the lifetime of the semiconductor laser or to detect the occurrence of the trouble from the maintenance data about a plurality of distribution terminal devices which are different from each other in frequency with which they are in use and circumstances under which they are in use.

According to the maintenance information management system of the present invention, since the first information processing device transmits the first information indicative of its own condition through the network to the second information processing device and the second information processing device receives the inputted first information indicative of the condition of the first information processing device through the network, stores therein the reference value concerning the first information, accumulates therein the inputted first information and generates the second information concerning the maintenance of the first information processing device based upon the inputted first information, the stored reference value and the accumulated first information, the maintenance data about a plurality of distribution terminal devices which are different from each other in frequency with which they are in use and circumstances under which they are in use are transmitted from the distribution terminal devices to the host computer, whereby the lifetime of the semiconductor laser can be predicted or the occurrence of the trouble can be detected by using the maintenance data.

INDUSTRIAL APPLICABILITY

The present invention relates to an information processing device and an information processing method, a maintenance information management system and a recording medium and may be applied to an information processing device and an information processing method, a maintenance information management system and a recording medium in which a lifetime of an part can be predicted or an occurrence of a trouble can be detected without receiving information from users or shops in which the distribution terminal devices are installed by transmitting maintenance data about a plurality of distribution terminal devices which are different in frequency with which they are in use and in circumstances under which they are in use to a host computer of a system in the system such as a content distribution system comprised of a plurality of information processing devices connected via a network.

What is claimed is:

1. An information processing device connected to a plurality of terminal devices, each terminal device including a laser and an optical pickup device, through a network, the information processing device comprising:

input means for receiving inputted first information indicative of conditions of the plurality of terminal devices through the network, the inputted first information including, for the terminal devices, respective information of a laser forward current, respective information of a power source voltage, and respective information of a temperature near the optical pickup device;

memory means for storing therein reference values concerning the first information;

accumulation means for accumulating therein the first information inputted by the input means; and generation means for generating second information concerning maintenance of the plurality of terminal devices based upon the first information inputted by the input means, the reference values stored in the memory means, the first information accumulated in the accumulation means, and whether a detected temperature abnormality exists for a predetermined period.

2. An information processing device according to claim 1, further comprising transmission means for transmitting content data to the plurality of terminal devices through the network, wherein the plurality of terminal devices are distribution terminal devices for providing a service in which the content data distributed through the network is recorded on a recording medium.

3. An information processing device according to claim 2, wherein the transmission means transmits the content data during a time period in which the power source voltage of the distribution terminal device is stable based upon the power source voltage of the distribution terminal device included in the first information.

4. An information processing device according to claim 1, further comprising:

output means for outputting, based on the input first information, a control signal to at least one of the plurality of terminal devices for improving an operating condition of the at least one of the plurality of terminal device.

5. An information processing device according to claim 1, wherein the second information generated by the generation means includes information expressing a lifetime prediction value of the laser of at least one of the plurality of terminal devices.

6. An information processing method of an information processing device connected to terminal devices, each terminal device including a laser and an optical pickup device, through a network, the information processing method comprising:

receiving inputted first information indicative of conditions of the terminal devices through the network, the inputted first information including, for the terminal devices, respective information of a laser forward current, respective information of a power source voltage, and respective information of a temperature near the optical pickup device;

storing reference values concerning the first information;

accumulating the first information inputted by the receiving; and generating second information concerning maintenance of the plurality of terminal devices based upon the first information inputted by the receiving, the reference values stored by the storing, the first information accumulated by the accumulating, and whether a detected temperature abnormality exists for a predetermined period.

7. A recording medium for recording thereon a computer-readable-program, the computer-readable-program for use with an information processing device connected to a plurality of terminal devices, each terminal device including a laser and an optical pickup device, through a network, the computer-readable program comprising computer readable code for:

receiving inputted first information indicative of conditions of the plurality of terminal devices through the network, the inputted first information including, for the terminal devices, respective information of a laser forward current, respective information of a power source voltage, and respective information of a temperature near the optical pickup device;

storing a reference value concerning the first information;

accumulating the first information inputted by the receiving; and generating second information concerning maintenance of the plurality of terminal devices based upon the first information inputted by the receiving, the reference value stored by the storing, the first information accumulated by the accumulating, and whether a detected temperature abnormality exists for a predetermined period.

8. A maintenance information management system comprising:

a plurality of terminal devices connected to a network; and a host information processing device to exchange information with the plurality of terminal devices through the network;

wherein the plurality of terminal devices include:

transmission means for transmitting first information indicative of their own conditions to the host information process device through the network, the inputted first information including, for the terminal devices, respective information of a laser forward current, respective information of a power source voltage, and respective information of a temperature near the optical pickup device; and wherein the host information processing device includes:

input means for receiving the first information indicative of the conditions of the plurality of terminal devices through the network;

memory means for storing therein reference values concerning the first information;

accumulation means for accumulating therein the first information inputted by the input means; and generation means for generating second information concerning maintenance of the plurality of terminal devices based upon the first information inputted by the input means, the reference values stored in the memory means, the first information accumulated in the accumulation means, and whether a detected temperature abnormality exists for a predetermined period.

9. A maintenance information management system according to claim 8, wherein the first information processing device is a distribution terminal device for providing a service in which content data distributed through the network is recorded on a recording medium, and the second information processing device is a host computer for distributing the content data through the network.

10. A maintenance information management system according to claim 9, wherein the recording medium is a magnetooptical disk.

* * * * *